(12) United States Patent
Zhang

(10) Patent No.: US 12,297,575 B2
(45) Date of Patent: May 13, 2025

(54) CONTROL METHOD FOR SQUEEZING WASHING MACHINE AND SQUEEZING WASHING MACHINE

(71) Applicant: Qingxiu Zhang, Guangdong (CN)

(72) Inventor: Qingxiu Zhang, Guangdong (CN)

( * ) Notice: Subject to any disclaimer, the term of this patent is extended or adjusted under 35 U.S.C. 154(b) by 280 days.

(21) Appl. No.: 18/041,752

(22) PCT Filed: Aug. 23, 2021

(86) PCT No.: PCT/CN2021/113949
§ 371 (c)(1),
(2) Date: Feb. 15, 2023

(87) PCT Pub. No.: WO2022/042461
PCT Pub. Date: Mar. 3, 2022

(65) Prior Publication Data
US 2024/0026588 A1     Jan. 25, 2024

(30) Foreign Application Priority Data
Aug. 23, 2020    (CN) .................... 202010853420.X

(51) Int. Cl.
| | | |
|---|---|---|
| *D06F 33/36* | (2020.01) | |
| *D06F 33/37* | (2020.01) | |
| *D06F 34/28* | (2020.01) | |
| *D06F 39/08* | (2006.01) | |
| *D06F 103/68* | (2020.01) | |
| *D06F 103/70* | (2020.01) | |
| *D06F 105/02* | (2020.01) | |
| *D06F 105/48* | (2020.01) | |

(52) U.S. Cl.
CPC .............. *D06F 33/36* (2020.02); *D06F 33/37* (2020.02); *D06F 34/28* (2020.02); *D06F 39/087* (2013.01); *D06F 2103/68* (2020.02); *D06F 2103/70* (2020.02); *D06F 2105/02* (2020.02); *D06F 2105/48* (2020.02)

(58) Field of Classification Search
CPC ..................................................... D06F 33/36
See application file for complete search history.

(56) References Cited

FOREIGN PATENT DOCUMENTS

| | | |
|---|---|---|
| CN | 1948598 A | 4/2007 |
| CN | 105088616 A | 11/2015 |
| JP | 2013052057 A | 3/2013 |
| KR | 20010004704 A | 1/2001 |

OTHER PUBLICATIONS

International search report of PCT/CN2021/113949.

*Primary Examiner* — Jason Y Ko

(57) ABSTRACT

Disclosed are a control method for a squeezing washing machine and the squeezing washing machine. The method includes: controlling a washing and spinning tub (6) to perform a water absorption wash; controlling the washing and spinning tub (6) to perform a squeezing wash, where the squeezing wash means that the washing and spinning tub (6) rotates at a second rotation speed for a second time period; and repeatedly and alternately controlling the washing and spinning tub (6) to perform the water absorption wash and the squeezing wash based on the preset number of cycles to complete the wash or the rinse. The method is conducive to reduction of wear of the clothes during the wash or the rinse and improves washing efficiency.

8 Claims, 4 Drawing Sheets

CONTROL METHOD FOR SQUEEZING WASHING MACHINE AND SQUEEZING WASHING MACHINE

CROSS REFERENCE TO RELATED APPLICATIONS

The present application claims the priority of Chinese Patent Application No. 202010853420. X, filed to the Chinese Patent Office on Aug. 23, 2020 and entitled "Centrifugal Squeezing Drum Washing Machine and Control Method Therefor", which is incorporated herein in its entirety by reference.

TECHNICAL FIELD

The present application belongs to the technical field of washing machines, and particularly relates to a control method for a squeezing washing machine and the squeezing washing machine.

BACKGROUND ART

At present, common washing machines on the washing machine market include drum washing machines, pulsator washing machines and agitator washing machines according to washing modes, are classified into a household type and an industrial type based on application fields, and have vertical drums and horizontal drums according to drum design modes. The pulsator washing machines and the agitator washing machines use vertical drums, while the drum washing machines use horizontal drum, and are further divided into a horizontal drum type and an inclined horizontal drum type.

Some existing pulsator washing machines already have a waterfall washing function. With the function, a washing and spinning tub is used to drive clothes to rotate, water in the clothes is thrown into an interlayer between a water catching tub and the washing and spinning tub under centrifugal force, is sprayed from an upper port of the washing and spinning tub after accumulating to a certain amount, and re-enters, by penetrating the clothes, the above interlayer under centrifugal force operation, through which a wash is performed circularly, produces little wear of the clothes through spraying, but results in a very low wash efficiency, and unevenness in a penetrating mode.

In the drum mode, accumulated water in a drain hose is drained first, clothes in a washing and spinning tub 6 are automatically weighed, after weighing, a preset automatic water supply level is automatically selected according to a weighing result, a water inlet valve is opened, and water first enters a washing powder compartment 2, blends with washing powder to enter a water catching tub 10, and enters the washing and spinning tub 6 through barrel wall holes of the washing and spinning tub 6 to soak the clothes. When a preset liquid level is reached, the water inlet valve is closed, and the washing and spinning tub 6 is rotated at a set rotation speed, which generates a centrifugal force F<the weight M of the clothes. During rotation, the clothes will fall naturally after being driven by paddles 8 inside the washing and spinning tub 6 from a low place to a high place, such throwing wash will cycle until a washing program is completed, then the washing and spinning tub 6 stops rotating, and a water drain pump drains water in the water catching tub 10, followed by a centrifugal spinning procedure, a first rinse, spinning, a second rinse and dewatering (spinning). The rinse is similar to the wash, and some washing machines have a function of extra rinses, with which a third rinse, a fourth rinse or more rinses can be performed. Through the method, the wash is time-consuming and causes heavy wear of the clothes.

SUMMARY OF THE DISCLOSURE

Technical Problems

An existing drum washing machine may perform a water absorption wash repeatedly during washes, which causes clothes to be worn heavily, and the wash to be time-consuming and low in efficiency.

Solution to the Problems

Technical Solution

The present application provides a control method for a squeezing washing machine and the squeezing washing machine, which may reduce the wear of the clothes by the squeezing washing machine during the wash.

In a first aspect, the present application provides a control method for a squeezing washing machine, where the squeezing washing machine includes a water catching tub and a washing and spinning tub, and the above control method includes:

during a wash or a rinse:
controlling the washing and spinning tub to perform a water absorption wash, where the water absorption wash means that the washing and spinning tub rotates at a first rotation speed for a first time period, and the centrifugal force generated by the first rotation speed on clothes in the washing and spinning tub is less than gravity exerted on the clothes;
controlling the washing and spinning tub to perform a squeezing wash, where the squeezing wash means that the washing and spinning tub rotates at a second rotation speed for a second time period, and the centrifugal force generated by the second rotation speed on the clothes in the washing and spinning tub is greater than the gravity exerted on the clothes; and
repeatedly and alternately controlling the washing and spinning tub to perform the water absorption wash and the squeezing wash based on the preset number of cycles to complete the wash or the rinse.

In a second aspect, the present application provides a squeezing washing machine, using the control method in the first aspect, where the squeezing washing machine includes a water catching tub and a washing and spinning tub, and further includes a first liquid level gauge, a first water pump, a water drain tank fixed under the water catching tub, a second water pump, a water drain hose and an electric control device for achieving an automatic wash;

where the first liquid level gauge is arranged on the water catching tub, the liquid level gauge is electrically connected to the electric control device, an outlet of the first water pump is connected to an outlet of the water catching tub, an inlet of the first water pump is connected to an inlet of the water drain tank, an outlet of the water drain tank is connected to an inlet of the second water pump, and an outlet of the second water pump is connected to the water drain hose.

BENEFICIAL EFFECTS OF THE INVENTION

Beneficial Effects

During the wash or the rinse of the present application: the washing and spinning tub is controlled to perform the water absorption wash, where the water absorption wash means that the washing and spinning tub rotates at the first rotation speed for the first time period, and the centrifugal force generated by the first rotation speed on the clothes in the washing and spinning tub is less than the gravity exerted on the clothes; the washing and spinning tub is controlled to perform the squeezing wash, where the squeezing wash means that the washing and spinning tub rotates at the second rotation speed for the second time period, and the centrifugal force generated by the second rotation speed on the clothes in the washing and spinning tub is greater than the gravity exerted on the clothes; and the washing and spinning tub is repeatedly and alternately controlled to perform the water absorption wash and the squeezing wash based on the procedure preset number of cycles to complete the wash or the rinse. According to the method, the clothes are washed or rinsed through repeated alternation of the water absorption wash and the squeezing wash, during the water absorption wash, the clothes may absorb water, get thrown and rubbed, and during the squeezing wash, the water in the clothes is squeezed out with the centrifugal force, thus taking away stains in the clothes. The method may not only shorten the washing time, but also reduce the wear of the clothes and improve the washing efficiency.

BRIEF DESCRIPTION OF THE DRAWINGS

In order to more clearly illustrate technical solutions in examples of the present application, the accompanying drawings required in the description of the embodiment or the prior art will be briefly introduced below. Apparently, the accompanying drawings in the following description are merely some examples of the present application, and those of ordinary skill in the art may still derive other accompanying drawings from these accompanying drawings without creative efforts.

In FIGS. 1-4:

Figure 1:
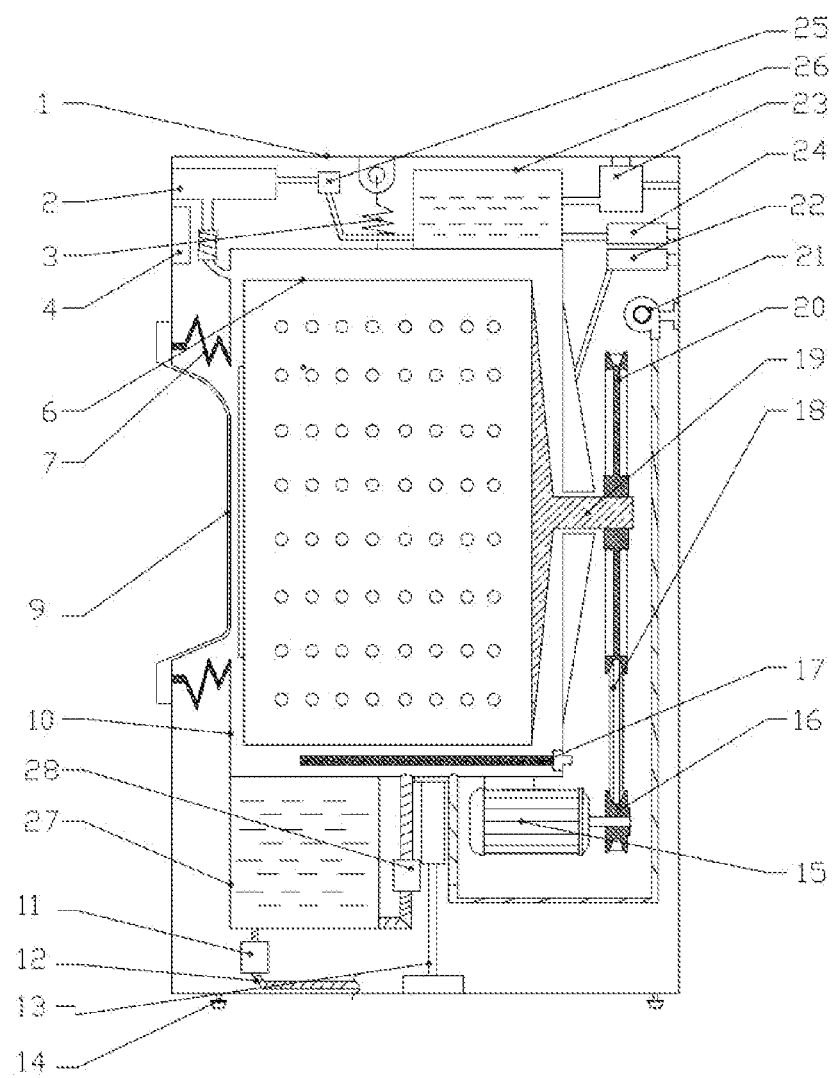
FIG. 1 is a structural schematic diagram of a longitudinal section of a squeezing washing machine according to an example of the present application.

1. outer body; 2. washing powder compartment; 3. damping tension spring; 4. electric control device; 5. counterweight module; 6. washing and spinning tub; 7. sealing ring; 8. paddle; 9. door; 10. water catching tub; 11. second water pump; 12. water drain hose; 13. damping bracket; 14. base; 15. motor; 16. small belt pulley; 17. heating pipe and temperature sensor; 18. belt; 19. drive shaft; 20. large belt pulley; 21. drying device; 22. first liquid level gauge; 23. water inlet solenoid valve; 24. second liquid level gauge; 25. third water pump; 26. water inlet tank; 27. water drain tank; and 28. first water pump.

DETAILED DESCRIPTION OF THE EMBODIMENTS

In the following description, specific details, such as specific system structures and technology, are set forth for the purpose of explanation rather than limitation, so as to thoroughly understand examples of the present application. However, it should be understood by those skilled in the art that the present application may be implemented in other examples without these specific details. In other instances, detailed descriptions of well-known systems, devices, circuits and methods are omitted so as to prevent unnecessary details from obscuring the description of the present application.

At present, common washing machines on the washing machine market include drum washing machines, pulsator washing machines and agitator washing machines according to washing modes, are classified into a household type and an industrial type based on application fields, and have vertical drums and horizontal drums according to drum design modes. The pulsator washing machines and the agitator washing machines use vertical drums, while the drum washing machines use horizontal drum, and are further divided into a horizontal drum type and an inclined horizontal drum type.

Some existing pulsator washing machines already have a waterfall washing function. With the function, a washing and spinning tub is used to drive clothes to rotate, water in the clothes is thrown into an interlayer between a water catching tub and the washing and spinning tub under centrifugal force, is sprayed from an upper port of the washing and spinning tub after accumulating to a certain amount, and re-enters, by penetrating the clothes, the above interlayer under centrifugal force operation, through which a wash is performed circularly, produces little wear of the clothes through spraying, but results in a very low wash efficiency, and unevenness in a penetrating mode.

In the drum mode, accumulated water in a drain hose is drained first, clothes in a washing and spinning tub 6 are automatically weighed, after weighing, a preset automatic water supply level is automatically selected according to a weighing result, a water inlet valve is opened, and water first enters a washing powder compartment 2, blends with washing powder to enter a water catching tub 10, and enters the washing and spinning tub 6 through barrel wall holes of the washing and spinning tub 6 to soak the clothes. When a preset liquid level is reached, the water inlet valve is closed, and the washing and spinning tub 6 is rotated at a set rotation speed, which generates a centrifugal force F<the weight M of the clothes. During rotation, the clothes will fall naturally after being driven by paddles 8 inside the washing and spinning tub 6 from a low place to a high place, such process of throwing and washing will cycle until a washing program is completed, then the washing and spinning tub 6 stops rotating, and a drain pump drains water in the water catching tub 10 followed by a centrifugal spinning procedure, a first rinse, spinning, a second rinse and dewatering (spinning). A rinse process is similar to the wash process, and some washing machines have a function of extra rinse, with which a third rinse, a fourth rinse or more rinses is may be performed. Through the method, the wash is time-consuming and causes heavy wear of the clothes.

Moreover, after the wash and the rinse are completed, the water is directly drained to the outside of the washing machine during a spin. In addition, in order to prevent the washing machine from shaking strongly and making noise during rotation of the washing and spinning tub 6, an existing washing machine has a counterweight module 5. The counterweight module 5 may reduce shaking and the noise of the washing machine during the spin, but increases a weight of the washing machine and results in the problem of inconvenient transportation.

To sum up, in the prior art, a control method for a washing machine and a structure of the washing machine itself have many defects. Therefore, aiming at the above technical problems, the present application provides a control method for a squeezing washing machine and the squeezing washing machine, which may shorten washing time, improve washing efficiency and reduce wear of clothes.

In order to facilitate understanding of a solution below, some terms used in the following description will be explained and described first:

A first speed: a washing and spinning tub 6 speeds up per certain acceleration to the first speed and keeps same during a water absorption wash. At this speed, the centrifugal force generated by clothes in the washing and spinning tub 6 is less than gravity exerted on the clothes.

A second speed: the washing and spinning tub 6 speeds up per certain acceleration to the second speed and keeps same during a squeezing wash. At this speed, the centrifugal force generated by the clothes in the washing and spinning tub 6 is greater than the gravity exerted on the clothes.

A third speed: the washing and spinning tub 6 speeds up per certain acceleration to the third speed and keeps same during a spin. At this speed, the centrifugal force generated by the clothes in the washing and spinning tub 6 is greater than the gravity exerted on the clothes.

A preset rotation speed: the washing and spinning tub 6 speeds up per certain acceleration to the preset rotation speed and keeps same during the squeezing wash or the spin. At this speed, the centrifugal force generated by the clothes in the washing and spinning tub 6 is greater than the gravity exerted on the clothes.

A first time period: time for the water absorption wash setting during program control.

A second time period: time for the squeezing wash setting during the program control.

A third time period: time for the spin setting during the program control.

In order to describe the technical solution proposed in the present application, specific examples will be combined below for description.

Figure 2:
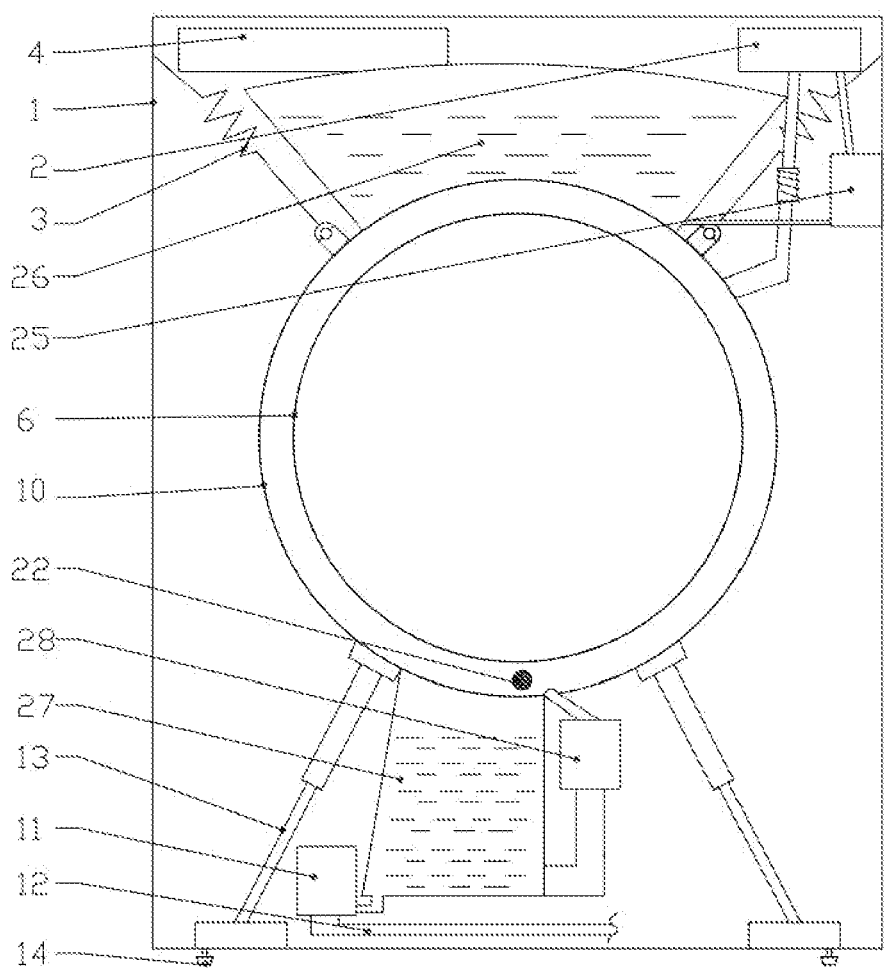
FIG. 2 is a structural schematic diagram of a horizontal section of a squeezing washing machine according to an example of the present application.

As shown in FIG. 2, a squeezing washing machine suitable for a control method of the present application is provided. The squeezing washing machine includes a water catching tub 10 and a washing and spinning tub 6, where the water catching tub 10 sleeves an outside of the washing and spinning tub 6, and a side wall of the washing and spinning tub 6 is provided with regularly arranged small holes. The washing and spinning tub 6 and the water catching tub 10 are arranged horizontally and coaxially, and an end of the washing and spinning tub 6 is connected to a drive shaft 19 extending outside the water catching tub 10. The drive shaft 19 is connected to a drive device, and the drive device includes a motor 15, a belt 18, a small belt pulley 16 and a large belt pulley 20. An output end of the motor 15 is connected to the small belt pulley 16, the motor is connected to the large belt pulley 20 through a belt 18, and the large belt pulley 20 is connected to the drive shaft 19. When the motor 15 is switched on, power is transmitted from the small belt pulley 16 to the large belt pulley 20, and the large belt pulley 20 drives the drive shaft 19 to rotate, and therefore drives the washing and spinning tub 6 to rotate.

In some examples, in order to cooperate with set washing flow, reduce the wear of the clothes during the wash and improve the washing efficiency, the squeezing washing machine further includes a first liquid level gauge 22, a first water pump 28, a water drain tank 27 fixedly arranged under the water catching tub 10, a second water pump 11, a water drain hose 12 and an electric control device 4; where the first liquid level gauge 22 is arranged on the water catching tub 10 and is electrically connected to the electric control device 4, an outlet of the first water pump 28 is connected to the water catching tub 10, an inlet of the first water pump 28 is connected to the water drain tank 27, an outlet of the water drain tank 27 is connected to an inlet of the second water pump 11, and an outlet of the second water pump 11 is connected to the water drain hose 12. Through arrangement of the second water pump 11 and the water drain tank 27, the water absorption wash and the squeezing wash described in the subsequent method may be implemented in cooperation with the control program, thus reducing the wear of the clothes during the wash.

During the squeezing wash or the spin, washing water is drained into the water drain tank 27, and the washing and spinning tub 6 accelerates from a low speed to a high speed, so vibration and noise generated by a machine body of the squeezing washing machine may be relatively small. In this case, a weight of a counterweight module 5 may be appropriately reduced or even the counterweight module 5 is not provided. That is to say, the water tank is used to replace the counterweight module 5, so as to reduce a weight of the entire squeezing washing machine, and improve transportation convenience of the squeezing washing machine.

In some examples, in order to improve efficiency of water injection into the water catching tub 10, the squeezing washing machine further includes a water inlet tank 26, a third water pump 25 and a washing powder compartment 2, where an inlet of the water inlet tank 26 is connected to the tap water hose, an outlet of the water inlet tank 26 is connected to an inlet of the third water pump 25, an outlet of the third water pump 25 is connected to the washing powder compartment 2, and the washing powder compartment 2 is connected to the water catching tub 10. Specifically, all connections forming a water flow passage may be connected through the hose, for instance, the washing powder compartment 2 and the water catching tub 10 may be connected through the hose. Through arrangement of the water inlet tank 26, water may be injected into the water inlet tank 26 through a faucet of the tap water hose when water injection is not required by the clothes, so as to guarantee a water quantity in the water inlet tank. When water injection is required, the water in the water inlet tank 26 may be directly pumped into the washing powder compartment 2 through the third water pump 25, and the water in the washing powder compartment 2 enters the washing water catching tub 10 through a hose connected to the washing water catching tub 10, thus achieving rapid water injection. Compared with a method of directly injecting water into the water catching tub 10 through the faucet of the tap water hose in the prior art, the method may effectively shorten time for water injection into the water catching tub 10, and further improve the washing efficiency.

It should be understood that when the squeezing washing machine is provided with the water inlet tank 26 and the water drain tank 27, a counterweight may be provided by controlling the water quantity in the water inlet tank 26 and a water quantity of the water drain tank 27 instead of the counterweight module 5, thereby greatly reducing the weight of the entire squeezing washing machine and improving the transportation convenience of the squeezing washing machine.

In some examples, in order to improve control over the water quantity in the water inlet tank 26, the squeezing washing machine further includes a water inlet solenoid valve 23, an inlet of the water inlet solenoid valve 23 is connected to the tap water hose, an outlet of the water inlet solenoid valve 23 is connected to the inlet of the water inlet tank 26, the water inlet tank 26 is provided with a second liquid level gauge 24 for detecting a water level in the water inlet tank 26, the second liquid level gauge 24 is electrically connected to the electric control device 4, and the electric control device 4 is further used for controlling the water inlet solenoid valve 23. A water level in the water inlet tank 26 is detected by the second liquid level gauge 24. When the water level is lower than a set threshold, the water inlet solenoid valve 23 may be controlled by the electric control device 4 to replenish the water inlet tank 26 with water, thus ensuring stability of the counterweight.

In some examples, in order to improve efficiency of the squeezing wash, a paddle 8 arranged on an inner wall of the washing and spinning tub 6 has a height less than or equal to 2 cm, and the height of the paddle 8 is a height of the paddle 8 protruding from the inner wall of the washing and spinning tub 6. It should be understood that in the case that the paddle 8 has a height less than or equal to 0 cm, the paddle 8 may not be arranged on the inner wall of the washing and spinning tub 6. By setting the height of the paddle 8 to be less than or equal to 2 cm, the clothes may be evenly distributed on the inner wall of the washing and spinning tub 6 during the high-speed rotation of the washing and spinning tub 6, thereby improving the efficiency of the squeezing wash of the washing and spinning tub 6.

In some examples, in order to reduce the wear of the clothes during the wash, the control method for a squeezing washing machine includes: performing a preset washing flow, and the preset washing flow includes the wash, the rinse and/or the spin.

Generally, the squeezing washing machine presets different washing modes, such as a mixed wash, a sterilization wash or a quick wash, for being selected by a user according to the specific number and/or materials of the clothes. Each washing mode corresponds to a preset washing flow. The preset washing flow may include the wash, the rinse and/or the spin, three washes may be performed separately or in any combined cycle to achieve a washing effect of the corresponding mode. For instance, the preset washing flow of the mixed wash may be: a wash-a spin-a rinse-a spin-a rinse-a spin-a rinse-a spin.

In some examples, in order to improve the washing efficiency and reduce the wear of the clothes, during the wash or the rinse:
step 101: the washing and spinning tub 6 is controlled to perform the water absorption wash;
step 102: the washing and spinning tub 6 is controlled to perform the squeezing wash; and
step 103: the washing and spinning tub 6 is repeatedly and alternately controlled to perform the water absorption wash and the squeezing wash based on the preset number of cycles to complete the wash or the rinse.

In this example, the water absorption wash means that the washing and spinning tub 6 rotates at a first rotation speed for a first time period, and the centrifugal force generated by the first rotation speed on clothes in the washing and spinning tub 6 is less than gravity exerted on the clothes. The squeezing wash means that the washing and spinning tub 6 rotates at a second rotation speed for a second time period, and the centrifugal force generated by the second rotation speed on the clothes in the washing and spinning tub 6 is greater than the gravity exerted on the clothes. It may be understood that the first rotation speed and the second rotation speed are maximum rotation speeds during the water absorption wash and the squeezing wash respectively. Specifically, the centrifugal force $F=w*M$ generated by the rotation speed on the clothes, where w refers to an angular speed when the washing and spinning tub 6 rotates at a certain rotation speed, and M refers to a weight of the clothes.

For the convenience of understanding a washing process or a rinsing process, for instance, if the preset number of cycles is 3, a corresponding washing process may be expressed as "a water absorption wash-a squeezing wash-a water absorption wash-a squeezing wash-a water absorption wash-a squeezing wash".

In the present application, due to frequent use of centrifugal squeezing washes and spins, an existing spin control mode of the drum washing machine, if used, may cause low efficiency, and prolonged total washing time since the such mode takes a long time to evenly distribute clothes before the centrifugal spin. Even distribution means that the clothes are evenly distributed on the inner wall of the washing and spinning tub 6 through mechanical action. As for the prolonged time for even distribution, the drum washing machine needs to empty the water out of the water catching tub 10 before the even distribution on one hand, and the paddles 8 of the drum washing machine may cause the inner wall of the washing and spinning tub 6 to be uneven despite being conducive to washing on the other hand.

In order to solve the above problem, the example of the present application proposes the following solution:

(1) During the squeezing wash, the washing and spinning tub 6 is controlled to accelerate to a preset rotation speed, and the centrifugal force generated by the preset rotation speed on clothes in the washing and spinning tub 6 is greater than gravity of the clothes. A liquid in the water catching tub 10 is started to be drained into the water drain tank 27, and the washing and spinning tub 6 is controlled to rotate at a second rotation speed for a second time period to complete the squeezing wash, where the second rotation speed is greater than or equal to the preset rotation speed.

(2) After the wash or the rinse is completed, the step that the washing and spinning tub 6 is controlled to perform a spin includes: the washing and spinning tub 6 is controlled to accelerate to a preset rotation speed, where centrifugal force generated by the preset rotation speed on the clothes in the washing and spinning tub 6 is greater than the gravity of the clothes; and a liquid in the water catching tub 10 is started to drained into the water drain tank 27, and the washing and spinning tub 6 is controlled to rotate at a third rotation speed for a third time period to complete the spin, where the third rotation speed is greater than or equal to the preset rotation speed.

(3) The paddle 8 arranged on the inner wall of the washing and spinning tub 6 has a height less than or equal to a present height, and the height of the paddle 8 is a height of the paddle 8 protruding from the inner wall of the washing and spinning tub 6.

In some examples, in order to achieve a better washing or rinsing effect, during the water absorption wash and the squeezing wash, the water absorption wash and a spin washing may be set to rotate in opposite directions, such as "a water absorption wash (clockwise)-a squeezing wash (counterclockwise)-a water absorption wash (clockwise)-a squeezing wash (counterclockwise)-a water absorption wash (clockwise)-a squeezing wash (counterclockwise)". It is certain that the washing and spinning tub 6 may also rotate counterclockwise during the water absorption wash, and the washing and spinning tub 6 rotates clockwise correspondingly during the squeezing wash. In order to smoothly switch the rotation direction of the washing and spinning tub 6, a pause for n seconds may be set after the water absorption wash and before the spin wash. For instance, "a water absorption wash (clockwise rotation)-a pause for n seconds-a squeezing wash (counterclockwise rotation)-a pause for n seconds-a water absorption wash (clockwise rotation)-a pause for n seconds-a squeezing wash (counterclockwise rotation)-a water absorption wash (clockwise rotation)-a pause for n seconds-a squeezing wash (counterclockwise rotation)". The pause for n seconds may be set according to specific needs, and may be set identical or different, specifically according to the rotation speed of the washing and spinning tub 6 before the pause.

In some examples, in order to reduce the energy consumption of the squeezing washing machine, the control method further includes:

In a process of repeatedly and alternately controlling the washing and spinning tub 6 to perform the water absorption wash and the squeezing wash based on the preset number of cycles:

After the washing and spinning tub 6 is controlled to perform the water absorption wash, the control method further includes: the liquid in the water catching tub 10 is drained into the water drain tank 27 of the squeezing washing machine.

After the washing and spinning tub 6 is controlled to perform the squeezing wash, the control method further includes: the liquid in the water drain tank 27 is conveyed into the water catching tub 10.

Before start of the wash and rinse, the clothes need to be soaked. Therefore, during the wash or rinse, in the case that the washing and spinning tub 6 is controlled to perform the water absorption wash for a first time, a water level may be preset as a condition for triggering the washing and spinning tub 6 to perform the water absorption wash. During this process, it should be understood that during the wash, water consumption of the wash and the rinse may be different. The wash requires water injection as little as possible to reduce a dilution degree of washing powder or laundry detergent, while the rinse is to dissolve residual dirt of the wash as much as possible. Therefore, in general, a water level of the rinse is higher than that of the wash. That is to say, a preset water level of a subsequent rinse or wash may change with change of a specific process. For instance, a preset water level of the wash is $H_1$, and a preset water level of the rinse is $H_2$, where $H_1 < H_2$.

In this example, "after the washing and spinning tub 6 is controlled to perform the water absorption wash" specifically means that in a process of repeating the water absorption wash and the squeezing wash, after the water absorption wash is performed, the liquid in the water catching tub 10 may be drained into the water drain tank 27 of the squeezing washing machine during the squeezing wash, thereby reducing resistance of the liquid in the water catching tub 10 to rotation of the washing and spinning tub 6 and saving energy consumption. Corresponding "after the washing and spinning tub 6 is controlled to perform the squeezing wash" means that in the process of repeating the water absorption wash and the squeezing wash, after the squeezing wash is performed, the water in the water drain tank 27 may be conveyed into the water catching tub 10 during the water absorption wash, such that the clothes may fully absorb water to be washed in a thrown manner.

In some examples, in order to improve a squeezing wash effect, during the squeezing wash:

The washing and spinning tub 6 is controlled, within the second time period, to accelerate to the preset rotation speed, where the centrifugal force generated by the preset rotation speed on the clothes in the washing and spinning tub 6 is greater than the gravity of the clothes.

The liquid in the water catching tub 10 is started to be drained into the water drain tank 27, and the washing and spinning tub 6 is controlled to rotate at the second rotation speed to complete the squeezing wash, where the second rotation speed is greater than or equal to the preset rotation speed.

The centrifugal force generated by the preset rotation speed on the clothes in the washing and spinning tub 6 is greater than the gravity of the clothes. When the preset rotation speed is reached, the liquid in the water catching tub 10 may be drained into the water drain tank 27. Since there is water at a bottom of the water catching tub 10 for a period from the start of the squeezing wash to the preset rotation speed, the clothes may be evenly distributed in the washing and spinning tub 6 conveniently. In this case, the water drain tank 27 may play the role of the counterweight module 5, reducing shaking of the squeezing washing machine and reducing noise generated thereby. When the liquid in the water catching tub 10 is drained into the water drain tank 27, the washing and spinning tub 6 may be controlled to rotate at the second rotation speed for the second time period to complete the squeezing wash. It should be understood that the second rotation speed is a highest rotation speed during the squeezing wash.

In some examples, the control method further includes:
after the wash or the rinse is completed, the step that the washing and spinning tub 6 is controlled to perform the spin includes The washing and spinning tub 6 is controlled, within the third time period, to accelerate to the preset rotation speed, where the centrifugal force generated by the preset rotation speed on the clothes in the washing and spinning tub 6 is greater than the gravity of the clothes.

The liquid in the water catching tub 10 is started to be drained into the water drain tank 27, and the washing and spinning tub 6 is controlled to rotate at the third rotation speed to complete the spin, where the third rotation speed is greater than or equal to the preset rotation speed.

The centrifugal force generated by the preset rotation speed on the clothes in the washing and spinning tub 6 is greater than the gravity of the clothes. When the preset rotation speed is reached, the liquid in the water catching tub 10 may be drained into the water drain tank 27. Since there is water at a bottom of the water catching tub 10 for a period from the start of the spin to the preset rotation speed, the clothes may be evenly distributed in the washing and spinning tub 6 conveniently. In this case, the water drain tank 27 may play the role of the counterweight module 5, reducing shaking of the squeezing washing machine and reducing noise generated thereby. When the liquid in the water catching tub 10 is drained into the water drain tank 27, the washing and spinning tub 6 may be controlled to rotate at the third rotation speed to complete the spin, where the third rotation speed is greater than or equal to the preset rotation speed, and it should be understood that the third rotation speed is a highest rotation speed during the spin. Assuming that the washing and spinning tub 6 has a diameter of 50 cm and the preset rotation speed is 390 rpm, the third rotation speed may be 390 rpm or 800 rpm. When the washing and spinning tub 6 accelerates to the preset rotation speed, the liquid in the water catching tub 10 is started to be drained into the water drain tank 27, and the washing and spinning tub continues to accelerate to the third rotation speed for the spin, thereby reducing time required for shaking clothes loose and improving the washing efficiency. This process may achieve a rapid spin and further reduce the wear of the clothes.

For the convenience of understanding, a preferred example is taken as an instance for description.

During a wash or a rinse, the following flows are included:

Step A: whether a water level of a water catching tub 10 exceeds a preset water level for a water absorption wash or a squeezing wash is detected, and if not, water injection is started.

Step B: if the water level of the water catching tub 10 reaches the preset water level, a washing and spinning tub 6 is controlled to perform the water absorption wash.

Step C: the washing and spinning tub 6 is controlled to perform the squeezing wash.

Step D: the washing and spinning tub 6 is repeatedly and alternately controlled to perform the water absorption wash and the squeezing wash based on the preset number of cycles to complete a target node.

For the convenience of understanding, steps A-D will be described by taking the wash as an instance, assuming that the preset water level of the washing process is $H_1$. Specifically, a current water level in the water catching tub 10 may be detected with a first liquid level gauge 22. If the current water level in the water catching tub 10 is lower than the preset water level $H_1$ for the water absorption wash, it is necessary to control a third water pump 25 to inject water into the water catching tub 10. However, if the current water level in the water catching tub 10 already reaches the preset water level $H_1$, water injection is stopped, and the washing and spinning tub 6 may be controlled to perform the water absorption wash. The water absorption wash means that the washing and spinning tub 6 rotates at a first rotation speed for a first time period, and after the first time period, a liquid in the water catching tub 10 is drained into a water drain tank 27 of the squeezing washing machine. To implement the water absorption wash, clothes are made to absorb water as much as possible, the centrifugal force generated by the first rotation speed on the clothes is less than gravity of the clothes. After the water absorption wash is performed, since the liquid is drained into the water drain tank 27, there is no liquid in the water catching tub 10 in this case, and the washing and spinning tub 6 may accelerate to perform the squeezing wash. The squeezing washing means that the washing and spinning tub 6 rotates at a second rotation speed for a second time period, and after the second time period, a liquid in the water drain tank 27 is pumped into the water catching tub 10, and the second rotation speed is greater than or equal to the first rotation speed. It should be understood that the reason why the second rotation speed is greater than the first rotation speed is that a liquid in the clothes is squeezed out by the centrifugal force generated by rotation of the washing and spinning tub 6 during the squeezing wash, and for achieving such goal, the centrifugal force generated by the second rotation speed on the clothes needs to be greater than the gravity of the clothes. Then, the above water absorption wash and squeezing wash are repeatedly performed until the number of cycles reaches the preset number of cycles, such that the current water absorption wash may be completed. It should be understood that the water absorption wash and the squeezing wash may have the same or different preset cycle times which may be set specifically according to requirements. For instance, the preset number of cycles corresponding to two nodes is 5; and alternatively, the preset number of cycles corresponding to the squeezing wash is 6, and the preset number of cycles corresponding to the squeezing wash is 4.

Further, in order to improve spin efficiency and guarantee safety of a machine, the squeezing wash or a spin is implemented through the following flows, and the spin is taken as an instance:

Step 1: the washing and spinning tub 6 is controlled to speed up from a rotation speed 0 to a preset rotation speed for a third time period based on certain acceleration.

Step 2: whether an eccentricity value of the washing and spinning tub 6 is greater than or equal to a preset eccentricity threshold within the third time period, if so, step 1 is re-performed; otherwise, step 3 is performed.

Step 3: a liquid in the water catching tub 10 is started to be drained into the water drain tank 27.

Step 4: the washing and spinning tub 6 is controlled to rotate at a third rotation speed for the third time period to complete the spin.

During the spin, the washing and spinning tub 6 may be controlled at first to perform the water absorption wash and the squeezing wash. After the two washes are performed, in order to avoid strong shaking of the washing and spinning tub 6 during high-speed rotation, it is necessary to carry out balance detection on the washing and spinning tub 6, that is, whether the eccentricity value of the washing and spinning tub 6 is greater than or equal to the preset deviation threshold value is detected. The smaller the set eccentricity threshold is, the smaller the shaking and noise generated will be. However, a small eccentricity threshold may cause prolonged time for shaking loose, or even fail the spin. On the contrary, the time for the shaking loose may be short and strong shaking and loud noise may be generated in the case that a great eccentricity threshold is set, so a reasonable preset eccentricity threshold is quite necessary. Then, a current eccentricity value of the washing and spinning tub 6 is determined according to the set eccentricity threshold. If the eccentricity value of the washing and spinning tub 6 is greater than or equal to the preset eccentricity threshold, it means that the washing and spinning tub 6 may generate strong shaking and loud noise during the high-speed rotation, and even safety of the machine may be affected. It is necessary to adjust the eccentricity value of the washing and spinning tub 6, that is, the washing and spinning tub 6 is re-controlled to sequentially perform step 1 and subsequent steps until the eccentricity value of the washing and spinning tub 6 is less than the preset eccentricity threshold.

When it is determined that the eccentricity value of the washing and spinning tub 6 is less than the preset eccentricity threshold value, and after the rotation speed of the washing and spinning tub reaches the preset rotation speed, the liquid in the water catching tub 10 may be drained into the water drain tank 27, and in this case, the water drain tank 27 may play the role of the counterweight module 5, so as to reduce the shaking of the squeezing washing machine and reduce the noise generated thereby. When the liquid in the water catching tub 10 is drained into the water drain tank 27, the washing and spinning tub 6 may be controlled to rotate at the third rotation speed for the third time period to complete the spin, where the third rotation speed may be greater than the second rotation speed. Assuming the second rotation speed is 390 rpm, the third rotation speed may be 800 rpm. When the washing and spinning tub 6 rotates at the third rotation speed for the spin, the preset eccentricity threshold is combined, such that a rapid spin is combined, and the time required for shaking the clothes loose is shortened.

Figure 3:
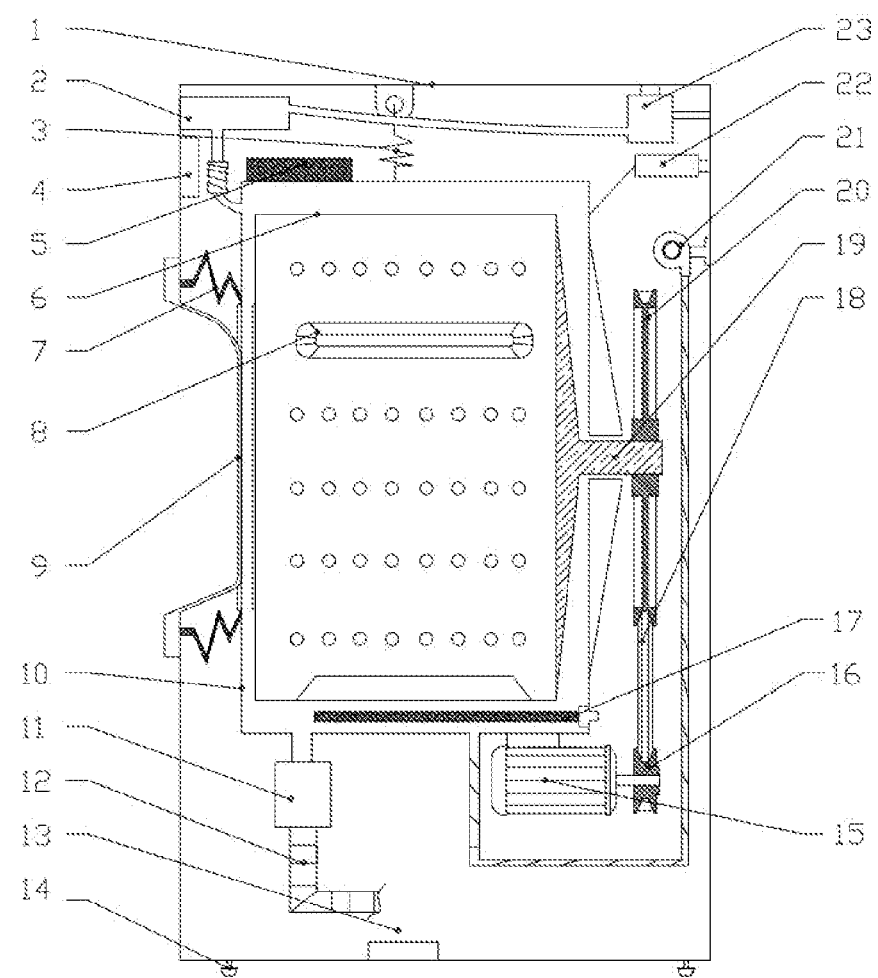
FIG. 3 is a structural schematic diagram of a longitudinal section of a squeezing washing machine in the prior art.
Figure 4:
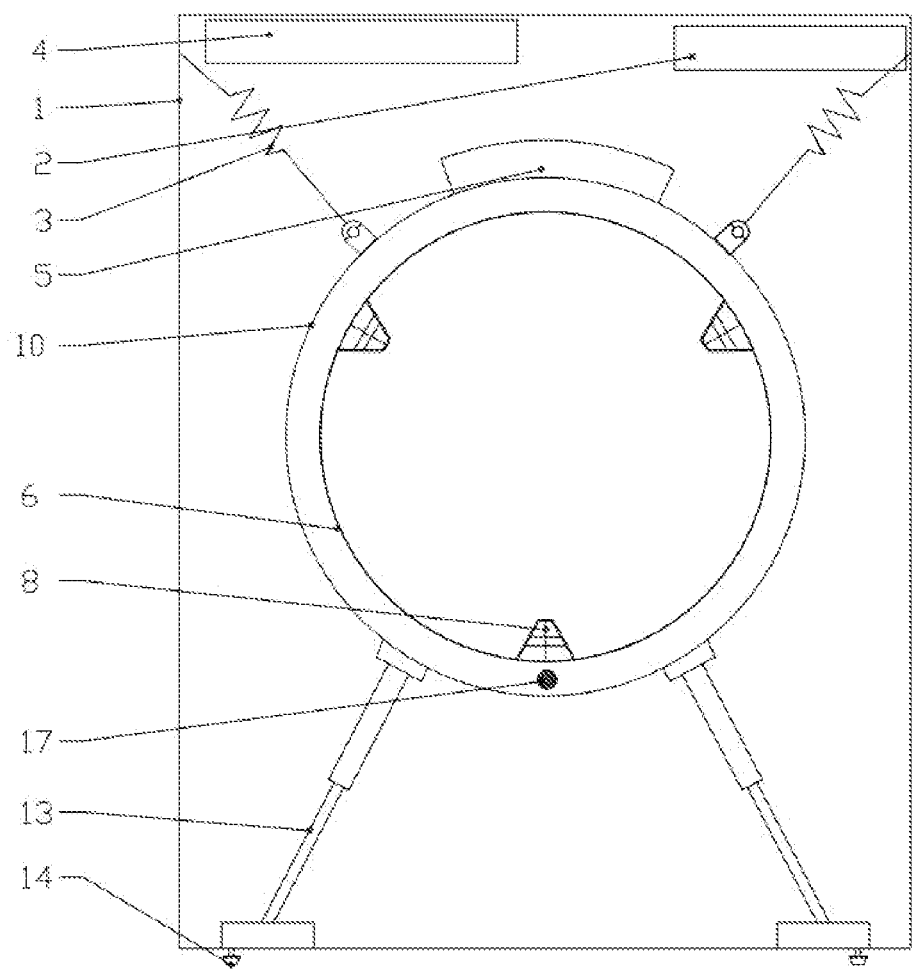
FIG. 4 is a structural schematic diagram of a horizontal section of a squeezing washing machine in the prior art.

As an instance rather than limitation, for the convenience of understanding of the control method and structural improvement of the present application, reference may be made to FIGS. 1-4, and a comparison between FIG. 1 and FIG. 3, as well as a comparison between FIG. 2 and FIG. 4 are combined.

With reference to FIGS. 1 and 2, it may be seen that the squeezing washing machine of the present application includes an outer body 1 and the water catching tub 10 arranged in the outer body 1, where the water catching tub 10 is connected to the outer body 1 through a damping tension spring 3 and a damping bracket 13, and the washing and spinning tub 6 is further arranged in the water catching tub 10. An end of the washing and spinning tub 6 is provided with a drive shaft 19, the drive shaft 19 is connected to a large belt 18 pulley, the large belt 18 pulley is connected to a belt 18 small belt 18 pulley 16 through a belt 18, and the belt 18 small belt 18 pulley 16 is connected to an output end of a motor 15, and the motor 15 is fixed on an outer wall of the water catching tub 10. The outer body 1 and the water catching tub 10 are each provided with a clothes put-in window, the clothes put-in window corresponds to the other end of the washing and spinning tub 6. The outer body 1 and the water catching tub 10 are connected to each other through a sealing ring 7, and a door 9 is rotatably connected to a side of the clothes put-in window of the outer body 1. The door 9 may form a closed space with the sealing ring 7 and the water catching tub when closed. The outer wall of the water catching tub 10 is further provided with the first liquid level gauge 22 for detecting the water level in the water catching tub 10, the water inlet tank 26 is arranged above the water catching tub 10, the inlet of the water inlet tank 26 is connected to the outlet of the water inlet solenoid valve 23 through a hose, the outlet of the water inlet solenoid valve 23 is connected to the tap water hose through a hose, the outlet of the water inlet tank 26 is connected to the inlet of the third water pump 25 through a hose, the outlet of the third water pump 25 is connected to the washing powder compartment 2 through a hose, and the washing powder compartment 2 is connected to the water catching tub 10 through a hose, thus forming a water inlet passage, that is, water from the tap water hose flows through the water inlet solenoid valve 23 into the water tank, and is pumped out from the washing powder compartment 2 from the water tank by the third water pump 25, and the water in the washing powder compartment 2 finally flows into the water catching tub 10. The water drain tank 27 is arranged under the water catching tub 10, the inlet of the water drain tank 27 is connected to the inlet of the first water pump 28 through a hose, the outlet of the first water pump 28 is connected to the water catching tub 10 through a hose, the outlet of the water drain tank 27 is connected to the inlet of the second water pump 11 through a hose, and the outlet of the second water pump 11 is connected to the water drain hose 12, thereby forming a water drain passage. The liquid to be drained from the water catching tub 10 flows through the first water pump 28 into the water drain tank 27, and the liquid in the water drain tank 27 is pumped out by the second water pump 11 and flows out through the water drain hose 12. If the second water pump 11 does not work, the liquid in the water drain tank 27 may enter the water catching tub 10 again through the first water pump 28.

Through the comparison between FIG. 3 and FIG. 4, the example of the present application may achieve the following beneficial effects:

(1) According to the present application, a water inlet speed in the water catching tub 10 may be increased by arranging the water inlet tank 26 and the third water pump 25, thereby improving the washing efficiency.

(2) The water inlet tank 26 and the water drain tank 27 are arranged and may replace the counterweight module 5 in the prior art, thereby reducing the weight of the entire squeezing washing machine.

(3) The water drain tank 27 and the second water pump 28 are arranged and may drain and pump out the water in the water catching tub 10, guarantee that the resistance caused by the water to the washing and spinning tub 6 is reduced in the case that the washing and spinning tub 6 is controlled to perform the squeezing wash, and achieve water absorption by the clothes in the case that the washing tub 6 is controlled to perform the water absorption wash.

(4) The paddles 8 are arranged in the washing and spinning tub 6 and may make the clothes evenly distributed on the inner wall of the washing and spinning tub 6, such that the washing effect of the washing and spinning tub 6 is better during the squeezing wash, and the wear of the clothes is reduced.

Further, the squeezing washing machine has the structure matching the control method therefor. During the wash of the clothes, the wash or the rinse is achieved by repeated alternation of the water absorption wash and the squeezing wash, thereby reducing the wear of the clothes, shortening the washing time and improving the washing efficiency. During the high-speed rotation of the washing and spinning tub 6, on account of shortening of the paddles 8, the clothes may be evenly distributed on the inner wall of the washing and spinning tub 6, and the squeezing effect of the liquid in the clothes is better. During the squeezing wash or the spin, the eccentricity threshold and the preset rotation speed are set, and the water in the water catching tub 10 is drained to the water drain tank 27, such that the water drain tank 27 matching the water inlet tank 26 may play the role of the counterweight module 5, and the washing and spinning tub 6 may achieve rapid squeezing or spins, thereby effectively shortening the time for shaking the clothes loose, shortening the total washing time and reducing the shaking of the squeezing washing machine.

The above examples are merely used to describe the technical solution of the present application rather than limiting the same. Although the present application has been described in detail with reference to the foregoing examples, those skilled in the art should understand that the technical solution described in the foregoing examples may still be modified, or some technical features therein may be equivalently substituted. However, these modifications or substitutions do not make the essence of the corresponding technical solution deviate from the spirit and scope of the technical solutions of each example of the present disclosure, and shall fall within the protection scope of the present application.

What is claimed is:

1. A control method for a squeezing washing machine, wherein the squeezing washing machine comprises a water catching tub and a washing and spinning tub, and the control method comprises:

during a wash or a rinse:

controlling the washing and spinning tub to perform a water absorption wash, wherein the water absorption wash means that the washing and spinning tub rotates at a first rotation speed for a first time period, and the centrifugal force generated by the first rotation speed on clothes in the washing and spinning tub is less than gravity exerted on the clothes;

controlling the washing and spinning tub to perform a squeezing wash, wherein the squeezing wash means that the washing and spinning tub rotates at a second rotation speed for a second time period, and the centrifugal force generated by the second rotation speed on the clothes in the washing and spinning tub is greater than the gravity exerted on the clothes; and repeatedly and alternately controlling the washing and spinning tub to perform the water absorption wash and the squeezing wash based on the preset number of cycles to complete the wash or the rinse.

2. The control method according to claim 1, wherein after the controlling the washing and spinning tub to perform a water absorption wash, the control method further comprises:

draining a liquid in the water catching tub into a water drain tank of the squeezing washing machine; and after the controlling the washing and spinning tub to perform a squeezing wash, the control method further comprises:

conveying the liquid in the water drain tank into the water catching tub.

3. The control method according to claim 1, wherein the control method further comprises:

during the squeezing wash:

controlling the washing and spinning tub to accelerate to a preset rotation speed, wherein centrifugal force generated by the preset rotation speed on the clothes in the washing and spinning tub is greater than the gravity of the clothes; and starting to drain a liquid in the water catching tub into a water drain tank, and controlling the washing and spinning tub to rotate at the second rotation speed for the second time period to complete the squeezing wash, wherein the second rotation speed is greater than or equal to the preset rotation speed.

4. The control method according to claim 1, wherein after the wash or the rinse is completed, controlling the washing and spinning tub to perform a spin comprises:

controlling the washing and spinning tub to accelerate to a preset rotation speed, wherein centrifugal force generated by the preset rotation speed on the clothes in the washing and spinning tub is greater than the gravity of the clothes; and starting to drain a liquid in the water catching tub into a water drain tank, and controlling the washing and spinning tub to rotate at a third rotation speed for a third time period to complete the spin, wherein the third rotation speed is greater than or equal to the preset rotation speed.

5. A squeezing washing machine, using the control method for a squeezing washing machine according to claim 1, wherein the squeezing washing machine comprises a water catching tub and a washing and spinning tub, and further comprises a first liquid level gauge, a first water pump, a water drain tank fixed under the water catching tub, a second water pump, a water drain hose and an electric control device for achieving an automatic wash;

wherein the first liquid level gauge is arranged on the water catching tub, the liquid level gauge is electrically connected to the electric control device, an outlet of the first water pump is connected to an outlet of the water catching tub, an inlet of the first water pump is connected to an inlet of the water drain tank, an outlet of the water drain tank is connected to an inlet of the second water pump, and an outlet of the second water pump is connected to the water drain hose.

6. The squeezing washing machine according to claim 5, wherein the squeezing washing machine further comprises a water inlet tank, a third water pump and a washing powder compartment;

wherein an inlet of the water inlet tank is connected to a tap water hose, an outlet of the water inlet tank is connected to an inlet of the third water pump, an outlet of the third water pump is connected to the washing powder compartment, and the washing powder compartment is connected to the water catching tub.

7. The squeezing washing machine according to claim 6, further comprising a water inlet solenoid valve, wherein an inlet of the water inlet solenoid valve is connected to the tap water hose, an outlet of the water inlet solenoid valve is connected to the inlet of the water inlet tank, the water inlet tank is provided with a second liquid level gauge for detecting a water level in the water inlet tank, the second liquid level gauge is electrically connected to the electric control device, and the electric control device is further used for controlling the water inlet solenoid valve.

8. The squeezing washing machine according to claim 5, wherein a paddle arranged on an inner wall of the washing and spinning tub has a height less than or equal to 2 cm, and the height of the paddle is a height of the paddle protruding from the inner wall of the washing and spinning tub.

* * * * *